Dec. 22, 1942.    G. W. PARKER, JR    2,306,119
VEHICLE BODY MOUNTING MEANS
Original Filed Dec. 1, 1938    2 Sheets-Sheet 2

WITNESSES:
Thomas W. Kerr, Jr.
George L. Comly

INVENTOR:
George W. Parker, Jr.,
BY Paul & Paul
ATTORNEYS.

Patented Dec. 22, 1942

2,306,119

UNITED STATES PATENT OFFICE 2,306,119

VEHICLE BODY MOUNTING MEANS

George W. Parker, Jr., Philadelphia, Pa., assignor to Specialty Engineering Company, Philadelphia, Pa., a corporation of Pennsylvania Original application December 1, 1938, Serial No. 243,327. Divided and this application October 24, 1940, Serial No. 362,509

4 Claims. (Cl. 296—35)

This invention relates to means for mounting bodies on the chassis frames of automobiles and the like, the present invention being a division of a co-pending application Serial No. 243,327 filed by me on December 1, 1938.

More specifically, my present invention is concerned with the support of commercial truck bodies of the character featured in the above identified application, upon the vehicle chassis in such a way as to afford it secure anchorage while effectively cushioning it against shocks encountered from any direction incident to travel of the vehicle over rough roads.

The foregoing desideratum I attain in practice as hereinafter more fully disclosed, through use of cushioning units characterized by upper and lower attaching members which are bonded to interposed components of rubber or other resilient material; by securing the lower attaching members to the tops of the chassis frame longitudinals; and by securing the upper attaching members to the bottoms of the corresponding body sills in line with the body uprights where the communication of shocks will be ineffective to strain the body framework.

In the attached drawings,

Fig. 4 is a fragmentary detail section in plan taken as indicated by the angled arrows IV—IV in Figs. 2 and 3.

Figure 1:
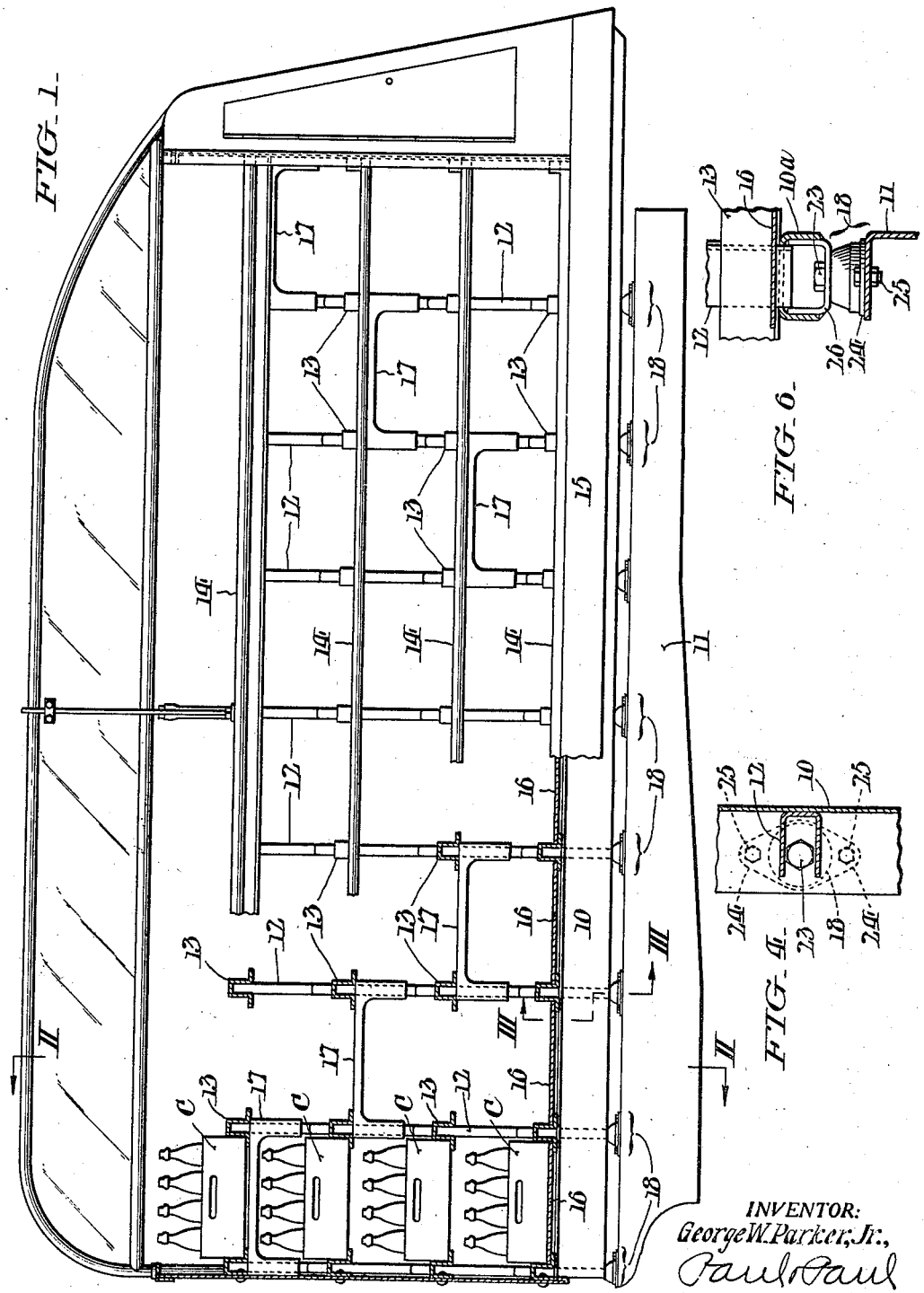
Fig. 1 is a view partly in side elevation and partly in longitudinal section of a commercial vehicle body showing the same supported by the truck chassis in accordance with my invention.
Figure 2:
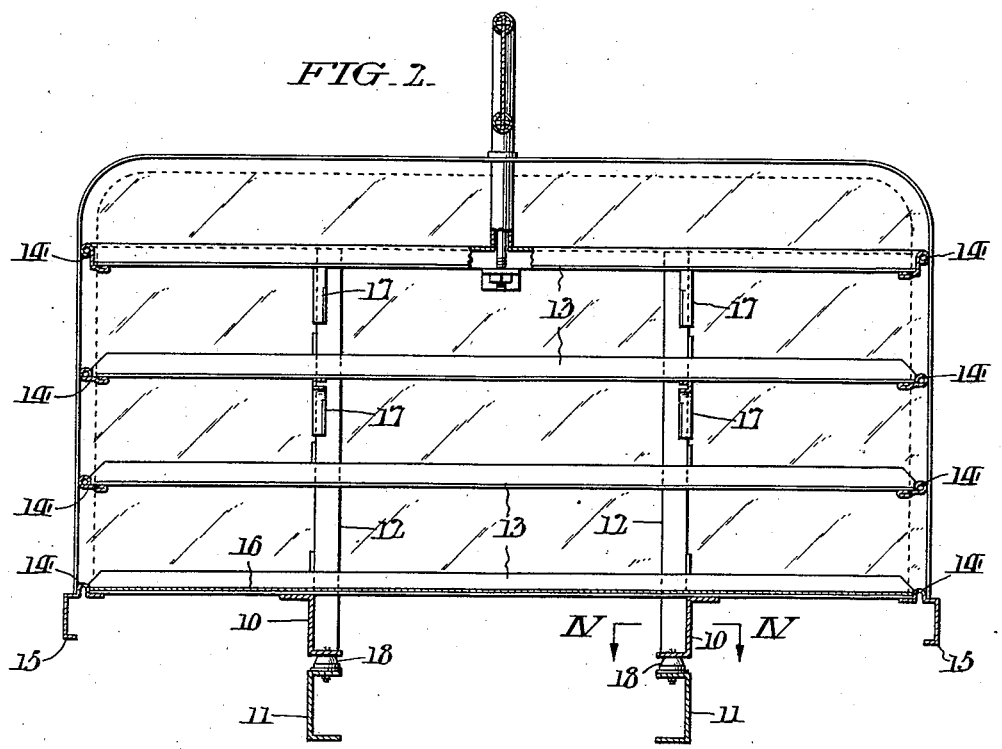
Fig. 2 is a cross sectional view of the organization taken as indicated by the angled arrows II—II in Fig. 1.
Figure 3:
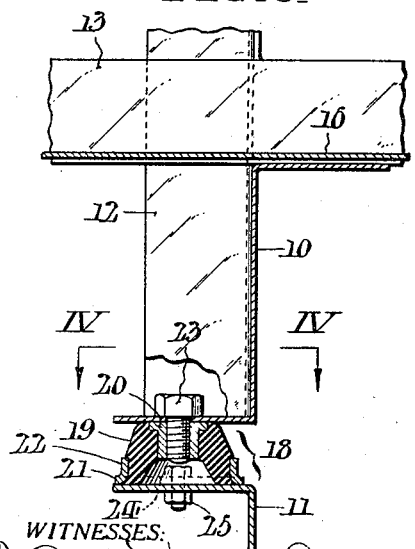
Fig. 3 is a detail sectional view drawn to a larger scale and taken as indicated by the angled arrows III—III in Fig. 1.

The vehicle body herein delineated for convenience of exemplifying my invention is identical with that of the co-pending application hereinbefore referred to, having a pair of laterally spaced Z section sills 10 with their upper flanges in opposed relation and directed inwardly of the truck body, said sills being spaced to correspond with that of the longitudinal channels 11 of the truck chassis frame. In its construction the truck body further includes channel section uprights 12 whereof the transverse webs are backed up against and welded or otherwise secured to the vertical webs of the sills 10 with their bottoms resting upon and welded to the lower flanges of said sills as shown in Figs. 2 and 3. From Fig. 1 it will be noted that the uprights 12 are arranged in equi-spaced relation along opposite sides of the truck body, and that corresponding transverse pairs of them pass through, and are connected, at vertically-spaced intervals, to cross members 13 which are of invert U cross section and have laterally-projecting longitudinal flanges. To the ends of the horizontally aligned rows of the cross members 13 are secured connecting side rails 14 which have upstanding edge beads and horizontal flanges which underreach and are connected to the bottoms of said cross members as shown in Fig. 2. The lowermost side rails 14 are extended downward in channel formation as at 15 for the purposes of increased strength and to serve as ornamental side aprons for the truck body. The body has a floor composed of plates 16 which fit between adjacent of the lowermost cross members 13, and which, at their side edges, rest upon the lateral flanges of such cross members. The subdivisions thus formed by the various components of the truck body are accessible from either side of the vehicle and are designed for the accommodation of bottle cases C or other packaged commodities. The body is strengthened against longitudinal distortion by braces 17 which are arranged in up and down diagonal sequence at opposite sides of the truck and which connect adjacent pairs of the uprights.

To mount the body in accordance with my invention I employ a plurality of vertically-arranged cushioning units 18 each of which, see Fig. 3 more particularly, comprises an annular conical body 19 of resilient material such as rubber or the like with an attaching member in the form of tapped bushing 20 bonded axially into the top thereof, and a lower attaching member 21 with an upstanding annular flange 22 thereto in which said body fits and is similarly secured by bonding. The individual cushioning units 18 are placed directly beneath the lower ends of the uprights 12 of the truck body and are secured to the bottom flanges of the Z section sills 10 within the hollows of said uprights (see Fig. 4) by cap bolts 23 which screw into the threaded bushings of said units. As shown, the lower attaching members 21 of the units 18 are formed with apertured base flanges 24 which are secured, by means of screw bolts 25 to the upper flanges of the chassis frame channels 11.

As a consequence of the arrangement just described, it will be seen that the truck body is effectively supported on the vehicle chassis frame in such a manner that shocks encountered from any direction during travel of the vehicle over rough roads, are effectively absorbed, and the body is thereby protected against distorting strains particularly in view of the fact that the cushioning units are positioned directly below junctives of the body uprights 12 with the sills 10.

Figure 5:
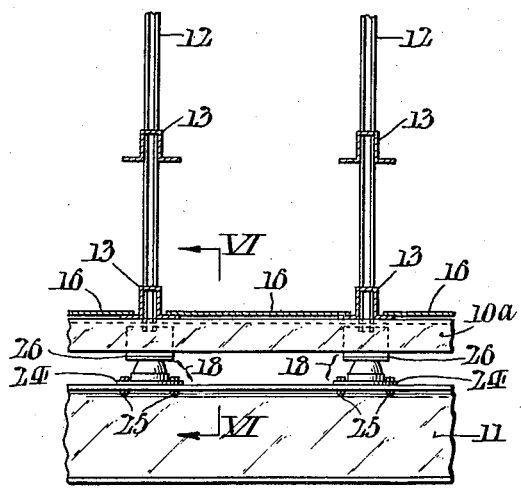
Fig. 5 is a fragmentary view corresponding to Fig. 1 showing an alternative form of my invention and, Fig. 6 is a detail sectional view taken as indicated by the angled arrows VI—VI in Fig. 5.

In Figs. 5 and 6 I have shown my invention in connection with a truck body of slightly modified construction, wherein instead of being of Z section, the sills are in the form of inverted channels 10a. Set into the sill channels 10a and suitably secured therein by welding or otherwise, are U shaped insert or filler pieces 26 which are centrally apertured for passage of the shanks of the cap bolts 23 which screw into the bushings 20 of the cushioning units 18 interposed between said sill channels and the chassis longitudinals in direct line with the uprights 12. As in the first described form of my invention, the base flanges 24 of the lower attaching members of the cushioning units 18 are secured by bolts 25 to the upper flanges of the chassis frame channels 11. In effect it will be seen that the cross webs of the sill channels 10a constitute rests for the bottom ends of the uprights 12. In all other respects the modification is identical in construction with the first described form as will be apparent from the drawings without the need of further description.

Having thus described my invention, I claim:

1. The combination with a truck body having a pair of lengthwise-extending members spaced to correspond with the longitudinals of a chassis frame, uprights arranged at intervals along opposite sides of the body and secured to said members, lateral projections on said members constituting rests to which the bottom ends of the uprights are secured, and load supporting cross members connected to transversely aligned pairs of the uprights at different levels; of body mounting means including resilient cushioning units which are interposed vertically between the rests aforesaid on the sills and the chassis frame longitudinals directly in line with the respective uprights, and means whereby said units are secured top and bottom to said rests and said longitudinals respectively.

2. The combination with a truck body having a pair of sills with upright webs and lateral bottom flanges spaced to correspond with the longitudinals of a chassis frame, uprights arranged at intervals along opposite sides of the body and secured within the angle hollows of the sills with their lower ends resting on and secured to the bottom flanges of the sills, and load supporting cross members connected to transversely aligned pairs of the uprights at different levels; of body mounting means including resilient cushioning units interposed vertically between the bottom flanges of the sills and the chassis frame longitudinals directly in line with the respective uprights, and means whereby said cushioning units are secured top and bottom to the sill flanges and said longitudinals respectively.

3. The combination according to claim 1, wherein the sills of the truck body are of Z cross section with their lower flanges directed inwardly toward each other; wherein the uprights of the body are of channel section with their bottoms resting on the lower flanges of the sills and their backs bearing against the vertical webs of the uprights; wherein the cushioning units have components of rubber or the like with upper and lower attaching elements bonded to the rubber; and wherein the securing means include bolts which pass through the lower flanges of the sills within the hollows of the uprights and engage the upper attaching elements of the respective cushioning units, and bolts whereby the lower attaching elements of said units are connected to the chassis longitudinals.

4. The combination according to claim 1, wherein the sills of the truck body are of channel cross section with their side flanges facing downward; wherein the connecting means have the form of U shaped fillers secured within the sill hollows beneath the individual uprights; wherein the cushioning units have components of rubber or the like with upper and lower attaching elements bonded to the rubber; and wherein the securing means include bolts which pass through the sill channel fillers and into the upper attaching elements of the cushioning units, and bolts passing through the lower attaching elements and through the chassis longitudinals.

GEORGE W. PARKER, Jr.